United States Patent
Watanabe

(10) Patent No.: US 10,577,953 B2
(45) Date of Patent: Mar. 3, 2020

(54) TURBINE STATOR VANE OF CERAMIC MATRIX COMPOSITE

(71) Applicant: IHI Corporation, Koto-ku (JP)

(72) Inventor: Fumiaki Watanabe, Tokyo (JP)

(73) Assignee: IHI Corporation, Koto-ku (JP)

( * ) Notice: Subject to any disclaimer, the term of this patent is extended or adjusted under 35 U.S.C. 154(b) by 480 days.

(21) Appl. No.: 15/272,863

(22) Filed: Sep. 22, 2016

(65) Prior Publication Data

US 2017/0009593 A1    Jan. 12, 2017

Related U.S. Application Data

(63) Continuation of application No. PCT/JP2015/068627, filed on Jun. 29, 2015.

(30) Foreign Application Priority Data

Jul. 14, 2014    (JP) .................................. 2014-143919

(51) Int. Cl.
    *F01D 9/04*    (2006.01)
    *F01D 25/24*   (2006.01)
    (Continued)

(52) U.S. Cl.
    CPC ............. *F01D 9/041* (2013.01); *C04B 35/80* (2013.01); *F01D 25/005* (2013.01);
    (Continued)

(58) Field of Classification Search
    CPC ... F01D 5/22; F01D 5/225; F01D 9/04; F01D 11/005
    See application file for complete search history.

(56) References Cited

U.S. PATENT DOCUMENTS

| 5,131,808 A | 7/1992 | Ciais et al. |
| 6,196,794 B1 * | 3/2001 | Matsumoto ......... B29C 65/5042 415/191 |

(Continued)

FOREIGN PATENT DOCUMENTS

| JP | 5-33602 | 2/1993 |
| JP | 2003-214180 | 7/2003 |

(Continued)

OTHER PUBLICATIONS

Extended European Search Report dated Nov. 8, 2011 in European Patent Application No. 15821785.1.

(Continued)

*Primary Examiner* — Kenneth Bomberg
*Assistant Examiner* — John S Hunter, Jr.
(74) *Attorney, Agent, or Firm* — Oblon, McClelland, Maier & Neustadt, L.L.P.

(57) ABSTRACT

A stator vane is comprised of: an airfoil section elongated in a radial direction relative to an axis; an outer band section continuous to an outer end of the airfoil section and bent in a circumferential direction relative to the axis; a first hook section continuous to a leading end in the axial direction of the outer band section and bent outward in the radial direction; a second hook section continuous to a trailing end in the axial direction of the outer band section and bent outward in the radial direction; an inner band section continuous to an inner end of the airfoil section and bent in the circumferential direction; a flange section continuous to an end in the axial direction of the inner band section and bent inward in the radial direction; and a reinforcement fiber fabric continuous throughout these sections and unitized with a ceramic.

6 Claims, 4 Drawing Sheets

(51) Int. Cl.
  *F01D 25/00* (2006.01)
  *C04B 35/80* (2006.01)
  *F01D 11/00* (2006.01)
  *F01D 5/28* (2006.01)

(52) U.S. Cl.
  CPC ............ *F01D 25/246* (2013.01); *F01D 5/282* (2013.01); *F01D 5/284* (2013.01); *F01D 11/001* (2013.01); *F01D 11/005* (2013.01); *F05D 2220/32* (2013.01); *F05D 2230/30* (2013.01); *F05D 2240/121* (2013.01); *F05D 2240/122* (2013.01); *F05D 2240/125* (2013.01); *F05D 2260/30* (2013.01); *F05D 2300/6033* (2013.01); *Y02T 50/672* (2013.01)

(56) References Cited

U.S. PATENT DOCUMENTS

| | | | |
|---|---|---|---|
| 6,648,597 | B1 | 11/2003 | Widrig et al. |
| 7,581,924 | B2 * | 9/2009 | Marini .................... F01D 5/081 415/191 |
| 9,605,543 | B2 * | 3/2017 | Nunez .................... C04B 35/571 |
| 9,784,113 | B2 * | 10/2017 | Fremont ............... B29C 70/222 |
| 2002/0127097 | A1 | 9/2002 | Darolia et al. |
| 2003/0185673 | A1 | 10/2003 | Matsumoto et al. |
| 2005/0254942 | A1 | 11/2005 | Morrison et al. |
| 2012/0099982 | A1 | 4/2012 | Coupe et al. |
| 2013/0089429 | A1 * | 4/2013 | Nunez .................. C04B 35/571 416/230 |
| 2014/0314556 | A1 | 10/2014 | Fremont et al. |
| 2014/0322024 | A1 | 10/2014 | Watanabe |
| 2015/0003978 | A1 | 1/2015 | Watanabe |
| 2016/0273372 | A1 | 9/2016 | Podgorski et al. |
| 2016/0348518 | A1 | 12/2016 | Podgorski et al. |

FOREIGN PATENT DOCUMENTS

| | | |
|---|---|---|
| JP | 2004-197622 | 7/2004 |
| JP | 3978766 | 9/2007 |
| JP | 2012-172575 | 9/2012 |
| JP | 2013-87663 | 5/2013 |
| JP | 2013-217320 | 10/2013 |
| RU | 2 523 308 C2 | 7/2014 |
| WO | WO 2013/060977 A2 | 5/2013 |
| WO | WO 2015/059409 A1 | 4/2015 |

OTHER PUBLICATIONS

Combined Office Action and Search Report dated Mar. 7, 2018 in Russian Patent Application No. 2017104235 (with English language translation), 13 pages.
International Search Report dated Oct. 6, 2015 in PCT/JP2015/068627 filed on Jun. 29, 2015 (with English translation).
Written Opinion dated Oct. 6, 2015 in PCT/JP2015/068627 filed on Jun. 29, 2015.

\* cited by examiner

TURBINE STATOR VANE OF CERAMIC MATRIX COMPOSITE

CROSS-REFERENCE TO RELATED APPLICATIONS

This application is a Continuation Application of PCT International Application No. PCT/JP2015/068627 (filed Jun. 29, 2015), which is in turn based upon and claims the benefit of priority from Japanese Patent Application No. 2014-143919 (filed Jul. 14, 2014), the entire contents of which are incorporated herein by reference.

BACKGROUND

Technical Field

The disclosure herein relates to turbine stator vanes of ceramic matrix composites, and in particular to turbine stator vanes in which a plurality of components is not joined together but is formed in a unitary body so that reinforcing fibers are continuous over the whole thereof.

Description of the Related Art

Ceramic matrix composites (CMCs) display high strength and are as well lightweight and highly resistant to heat. In light of such superiority, there are some studies on application of CMCs to airplanes, or in particular to components of these jet engines. If turbine rotor blades and stator vanes could be produced from CMCs, they could contribute significantly to improvement of performance and fuel economy.

High strength of CMCs owes much to reinforcing fibers in its matrix. If adhesion or mechanical joining is used for producing a structure, the reinforcing fibers lose continuity there and the strength is therefore severely reduced. Accordingly, CMCs have difficulty in being applied to intricately shaped structures that need joining a plurality of components. Studies in the past have mainly focused on application to simply shaped components.

The following documents disclose related arts.
Japanese Patent Application Laid-open No. 2013-87663 A
Japanese Patent Application Laid-open No. 2013-217320 A

SUMMARY

In a turbine rotor blade disclosed in JP 2013-87663 A, a reinforcement fiber fabric could be continuous from a blade section to a platform section but the continuity is impaired in the platform section. In a stator vane disclosed in JP 2013-217320 A, as at least an airfoil section and an outer band section are produced from separate reinforcement fiber fabrics, the reinforcing fibers must not be continuous therebetween. More specifically, according to the prior art, it is difficult to make reinforcing fibers be continuous throughout a component if the component has an intricately shaped structure as with the stator vane and it is therefore difficult to thoroughly enjoy superiority of CMCs. The content of the disclosure herein has been created in light of this problem.

According to an aspect, a stator vane arranged around an axis to form a turbine nozzle is comprised of: an airfoil section elongated in a radial direction relative to the axis; an outer band section continuous to an outer end of the airfoil section and bent in a circumferential direction relative to the axis; a first hook section continuous to a leading end in the axial direction of the outer band section and bent outward in the radial direction; a second hook section continuous to a trailing end in the axial direction of the outer band section and bent outward in the radial direction; an inner band section continuous to an inner end of the airfoil section and bent in the circumferential direction; a flange section continuous to an end in the axial direction of the inner band section and bent inward in the radial direction; and a reinforcement fiber fabric continuous throughout the airfoil section, the outer band section, the first hook section, the second hook section, the inner band section and the flange section and unitized with a ceramic.

According to another aspect, a method for producing a stator vane arranged around an axis to form a turbine nozzle is comprised of: elongating a reinforcement fiber fabric in a radial direction relative to the axis to form an airfoil section; bending an outer end of the airfoil section in a circumferential direction relative to the axis to form an outer band section continuous to the airfoil section; bending a leading end in the axial direction of the outer band section outward in the radial direction to form a first hook section continuous to the outer band section; bending a trailing end in the axial direction of the outer band section outward in the radial direction to form a second hook section continuous to the outer band section; bending the reinforcement fiber fabric at an inner end of the airfoil section in the circumferential direction to form an inner band section continuous to the airfoil section; bending an end in the axial direction of the inner band section inward in the radial direction to form a flange section continuous to the inner band section; and unitizing the reinforcement fiber fabric with a ceramic to make the reinforcement fiber fabric be continuous throughout the airfoil section, the outer band section, the first hook section, the second hook section, the inner band section and the flange section.

DETAILED DESCRIPTION OF THE EXEMPLARY EMBODIMENTS

Exemplary embodiments will be described hereinafter with reference to the appended drawings. It is particularly noted that these drawings are not always drawn to scale exactly and therefore dimensional relations among elements are not limited to those shown therein.

The present embodiments are applicable to gas turbine engines for example and are in particular preferably applicable to components with intricately shaped structures such as stator vanes that constitute turbine nozzles. This is, however, no more than an example and thus the present embodiments are applicable to so many other machinery components that require high-temperature strength. The present embodiments will be described below with exemplifying a stator vane 1 illustrated in FIG. 3.

The stator vane 1 is substantially as a whole formed of a ceramic matrix composite (CMC). Its reinforcing fibers are any one of silicon carbide fibers, carbon fibers, silicon nitride fibers, alumina fibers, and boron nitride fibers, but may be of any other proper ceramic or any mixture of two or more of them.

In connection with a fact that the stator vane 1 requires a considerable thickness, a three-dimensional fabric in which the reinforcing fibers are three-dimensionally woven or knit is preferably used. Or, a plurality of two-dimensional fabrics that are interlayered or those stitched together with reinforcing fibers may be used. The orientation of the fabric should be properly selected in light of the directions of stress applied to the stator vane.

The fabric formed of the reinforcing fibers is temporarily formed and is unitized with a ceramic that is formed by steps of infiltration, sintering and such, so that the stator vane 1 formed of a CMC is produced.

Figure 1:
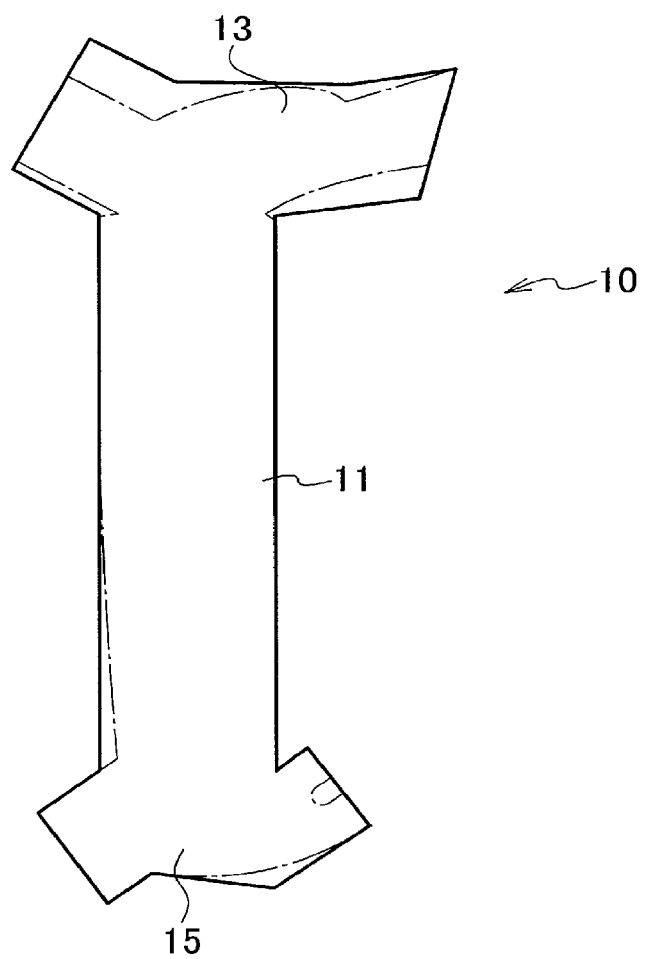
FIG. 1 is a schematic plan view of a reinforcement fiber fabric used in an embodiment.
Figure 3:
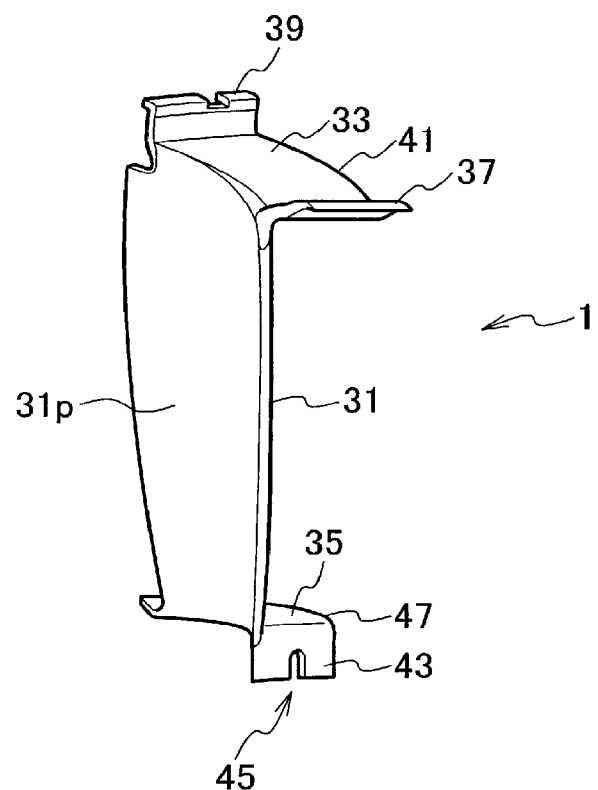
FIG. 3 is a perspective view of a machined stator vane formed of a CMC.

Referring to FIG. 1 in combination with FIG. 3, a reinforcement fiber fabric 10 is first cut into a shape corresponding to an archetype of the stator vane 1. Cutting may be either prior to or after formation of the ceramic.

More specifically, the reinforcement fiber fabric 10 is, in general, cut out so as to include a part 11 going to be an airfoil section, a part 13 laterally expanding from one end of the part 11, which is going to be an outer band section, and a part 15 expanding from another end, which is going to be an inner band section. There should be, however, left any proper margin relative to a minimum required shape (indicated by chain lines in the drawing) to allow losses by machining in the subsequent process. Of course the reinforcing fibers are continuous throughout this structure.

Figure 2:
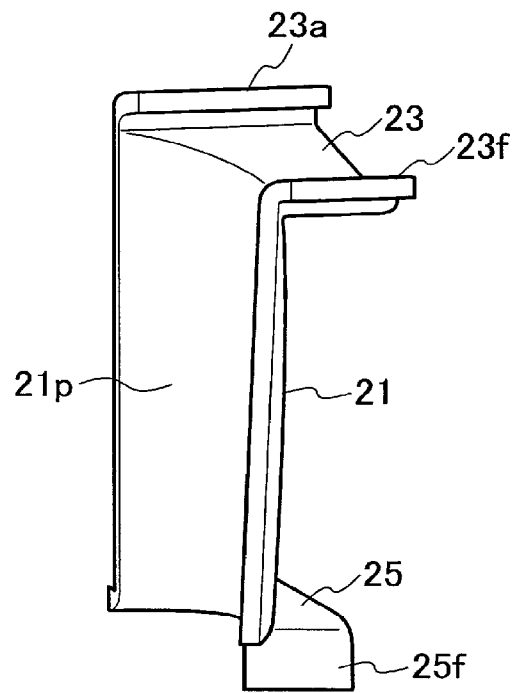
FIG. 2 is a perspective view of the reinforcement fiber fabric temporarily formed.

Referring to FIG. 2 in combination with FIGS. 1 and 3, the reinforcement fiber fabric 10 is bent into a shape approximate to the stator vane 1. Bending may be made by fitting the reinforcement fiber fabric 10 into a mold and then pressurizing them but may be alternatively made by any other method.

The part 11 to be the airfoil section is made to be straight in its lengthwise direction and moderately curved in its lateral direction so as to form a curved section 21. This curved section 21 approximates a so-called airfoil shape having its one face 21p going to be a pressure side.

The part 15 going to be the inner band section is bent substantially at right angles to the curved section 21 to form an inner bent section 25. It is further bent downward (inward in a radial direction of the turbine nozzle) at the end 25f corresponding to a front end in the axial direction. This part is going to be a flange section.

The reinforcement fiber fabric 10 temporarily formed as described above is unitized with a matrix of a ceramic. Any publicly known method is applicable to the method for forming the matrix. For example, the matrix may infiltrate into the fibers by using gaseous chemical reactions. Or, solid powders as a precursor of the matrix may be made into slurry, then the slurry may be made to infiltrate into the fibers and may be thermally decomposed or sintered. By means of such processes, the matrix of the ceramic is generated and unitized with the reinforcement fiber fabric 10.

Referring to FIG. 3, the ceramic united with the reinforcement fiber fabric 10 shown in FIG. 2 in combination with FIG. 1 is, in a way as described below, machined to form the stator vane 1.

Figure 6:
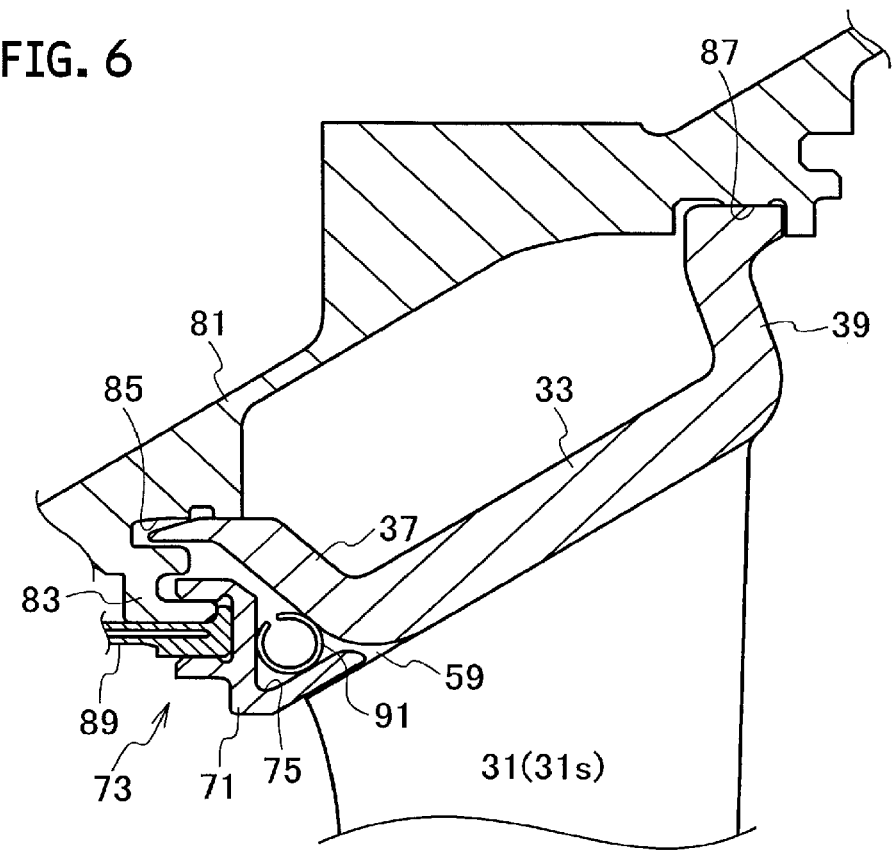
FIG. 6 is a partial sectional elevational view mainly showing a combination of a housing of a turbine and the outer band section.

The curved section 21 (see FIG. 2) is machined to form an airfoil section 31 with a so-called airfoil shape, which has a pressure side 31p and a suction side 31s (see FIG. 6).

An outer bent section 23 (see FIG. 2) is machined to form an outer band section 33. An end face 41 in the circumferential direction of the outer band section 33 has a shape complementary to an outer band section 33 or a pressure side 31p of an adjoining stator vane 1, thereby the adjoining outer band sections 33 are capable of coming in close contact with each other as shown in FIG. 4.

Figure 5A:
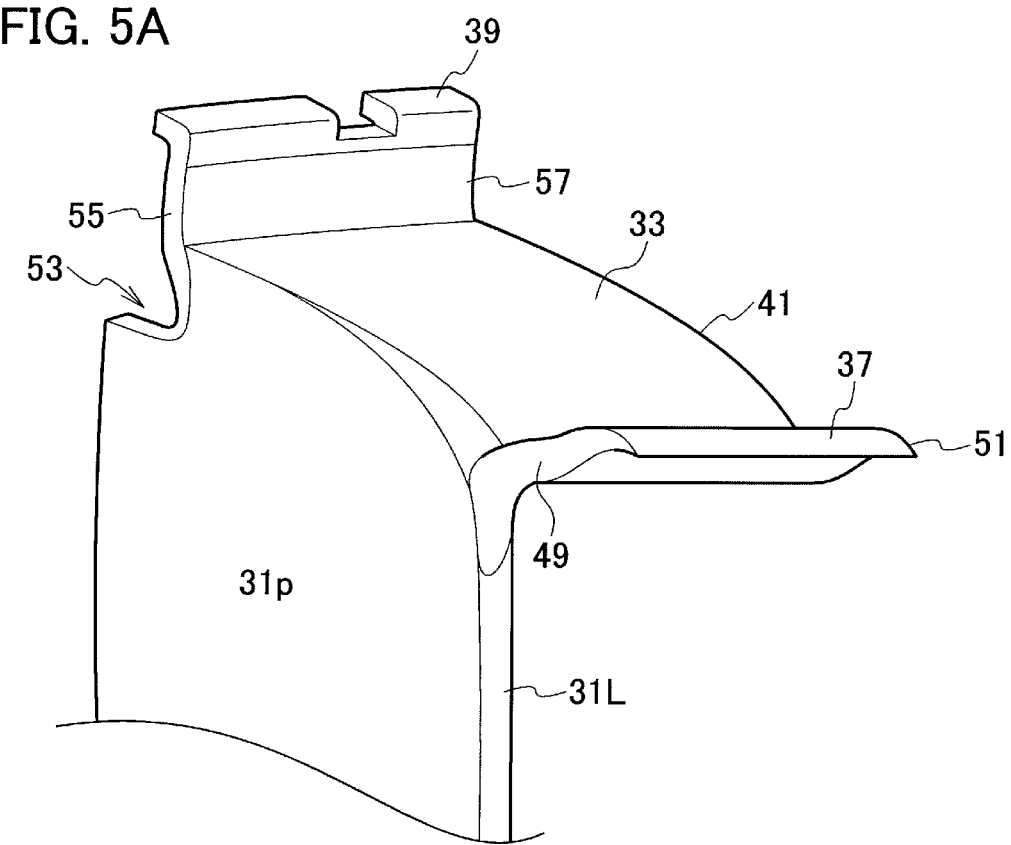
FIG. 5A is a partial perspective view enlarging and showing an outer band section and its surroundings of the stator vane according to the present embodiment.

Referring to FIG. 5A in combination with FIG. 3, both ends 23f, 23a of the outer bent section 23 (see FIG. 2) are also machined to respectively form a fore hook section 37 and an aft hook section 39.

In the fore hook section 37, brims close to the airfoil section in the circumferential direction may be cut out to form a cutout face 49. The cutout face 49 is preferably formed so as to range from a front edge 31L at the front in the axial direction of the airfoil section 31 to an end at the front of the outer band section 33 and further to a front end of the fore hook section 37 and connects them obliquely and smoothly. This cutout contributes improvement of strength, while its details will be described later.

Figure 4:
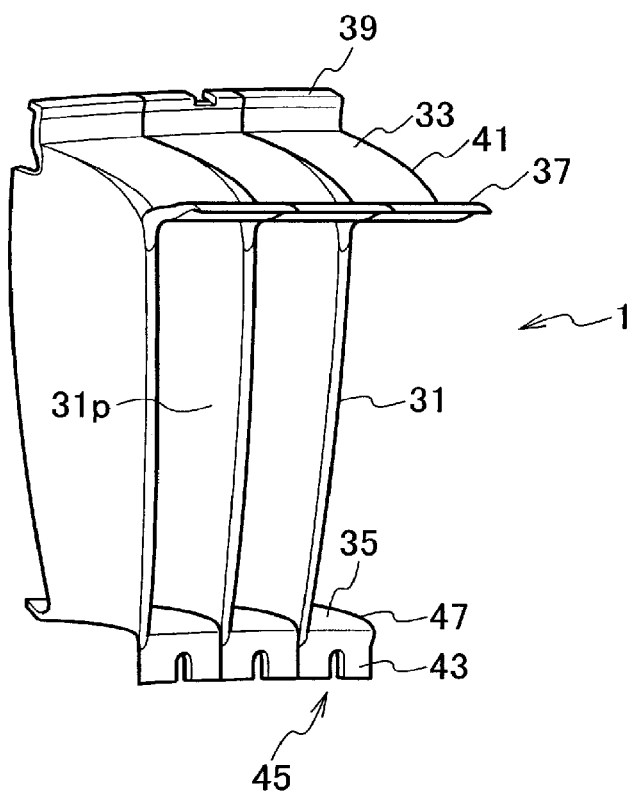
FIG. 4 is a perspective view of a plurality of stator vanes arranged around an axis and assembled together.

An edge 51 opposite thereto in the end face 41 and the fore hook section 37 has a shape complementary to that of the cutout face 49, thereby the adjoining fore hook sections 37 are capable of coming in close contact with each other as shown in FIG. 4.

Similarly, the aft hook section 39 may have a cutout 53. Its both edges 55, 57 have shapes complementary to each other, thereby the adjoining aft hook sections 39 are capable of coming in close contact with each other.

Referring back to FIG. 3 in combination with FIG. 2, the inner bent section 25 is machined to form an inner band section 35 and its end 25f comes to be a flange section 43. In the flange section 43, a notch 45 is provided, through which a pin described later is made to pass. An end face 47 in the circumferential direction of the inner band section 35 has a shape complementary to an inner band section 35 or a pressure side 31p of an adjoining stator vane 1, thereby the adjoining inner band sections 35 are capable of coming in close contact with each other as shown in FIG. 4.

As being understood from the above description, a plurality of stator vanes 1 is arranged around the axis to constitute a turbine nozzle. In the turbine nozzle, hot gas flow passes through a circular flow path defined by the outer band sections 33 and the inner band sections 35 and the airfoil sections 31 vector this flow to rotor blades.

The stator vane 1 of the present embodiment will be incorporated into a gas turbine engine in a way as described below.

Referring to FIG. 6, a housing 81 of the turbine is comprised of a fore rail 83 and an aft rail 87. The fore hook section 37 engages with the fore rail 83 and the aft hook section 39 engages with the aft rail 87.

While the cutout 59 at the front edge of the fore hook section 37 looks like a V-letter concave in a view of FIG. 6, a clamp 71 is inserted therein so as to engage with the cutout 59. The clamp 71, by means of a pinch portion 73 at the front end thereof, pinches the fore rail 83 along with a rear end of a shroud 89 at the former stage of the stator vane. A C-ring 91 is preferably, in a state of being repulsively compressed, inserted into a recess 75 at the rear of the clamp 71, thereby pressing the clamp 71 forward and downward. The clamp 71 is therefore prevented from being displaced from the fore rail 83, thereby the shroud 89 is prevented from falling off. The C-ring 91 further presses the fore hook section 37 upward, thereby pressing and fixing the fore hook section 37 against a basal face 85 of the fore rail 83.

Figure 7:
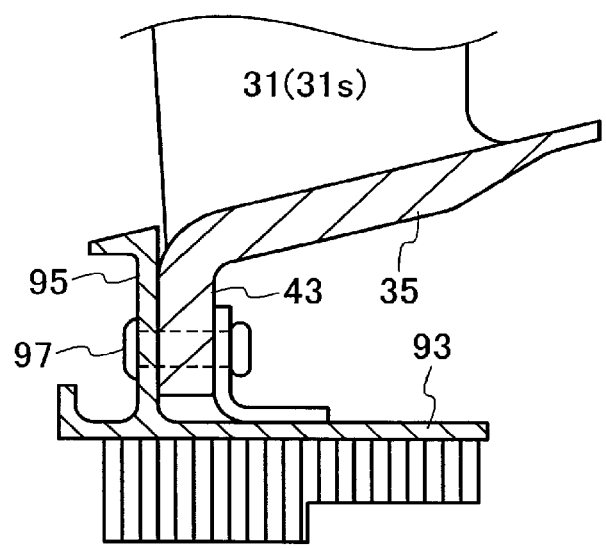
FIG. 7 is a partial sectional elevational view mainly showing a combination of a stationary member and an inner band section.

Referring to FIG. 7, the housing 81 (see FIG. 6) is comprised of a support ring 93 as a member stationary thereto, and a support plate 95 stands radially from the support ring 93. The flange section 43 extending downward from the inner band section 35 is fixed to the support plate 95 by means of a pin 97.

The stator vane 1 of the present embodiment may be incorporated into the housing 81 in a way similar to the prior art. Unlike the prior art, however, the outer band section 33 and the inner band section 35 are both no more than bent sections from the airfoil section 31 in one direction but can closely define the flow path as with those of the prior art as being understood from FIG. 4.

According to the present embodiment, as the respective sections are formed mainly by bending a single unitary reinforcement fiber fabric, the reinforcing fibers are continuous throughout the airfoil section 31, the outer band section 33, the fore hook section 37, the aft hook section 39, the inner band section 35, and the flange section 43. As there's no part where the fibers are discontinuous, the embodiment assures high strength.

Figure 5B:
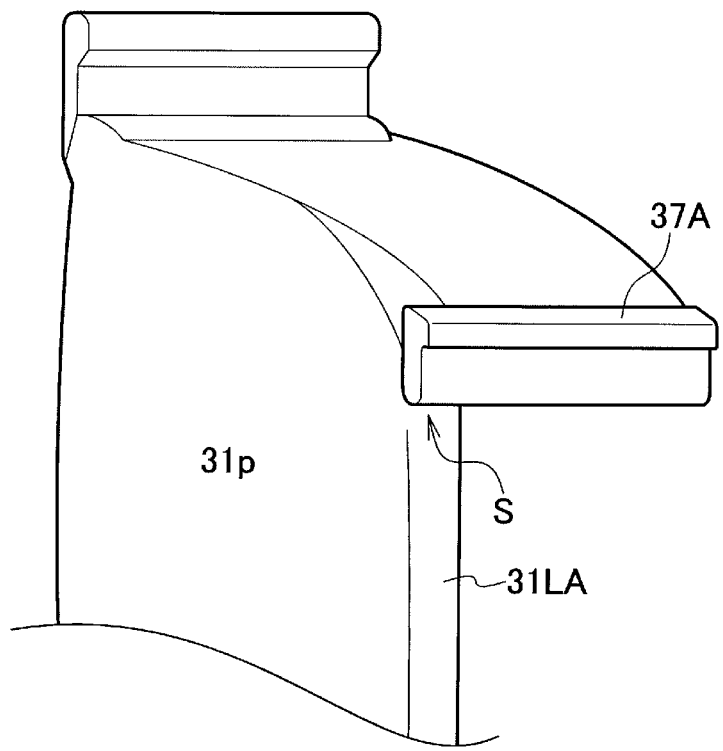
FIG. 5B is a partial perspective view enlarging and showing an outer band section and its surroundings of a stator vane of an example without a cutout.

The cutout 59 contributes improvement of the strength of the stator vane 1. More specifically, a stator vane without the cutout 59, as shown in FIG. 5B, necessitates formation of a part S where a fore hook section 37A keenly projects out of a very thin front edge 31LA. High-temperature gas flow generates stress in a direction to twist the airfoil section and this stress is transmitted from a leading edge 31LA to the fore hook section 37A. This transmitted stress causes stress concentration at the part S and thus increases risk of rupture of the stator vane.

According to the present embodiment, as the face 49 formed by the cutout 59 connects the leading edge 31L with the fore hook 37 obliquely and smoothly, stress concentration is effectively relaxed. In addition, existence of the cutout 59 does not generate any gap between the adjoining stator vanes 1 because the end face 41 and the edge 51 form a shape complementary thereto.

Although certain embodiments have been described above, modifications and variations of the embodiments described above will occur to those skilled in the art, in light of the above teachings.

INDUSTRIAL APPLICABILITY

A stator vane formed of a CMC with high strength, lightweight properties and excellent heat resistance is provided.

What is claimed is:

1. A stator vane arranged around an axis to form a turbine nozzle, comprising:
    an airfoil section elongated in a radial direction relative to the axis;
    an outer band section continuous to an outer end of the airfoil section and bent in a circumferential direction relative to the axis;
    a first hook section continuous to an axially leading end of the outer band section and bent outward in the radial direction;
    a second hook section continuous to an axially trailing end of the outer band section and bent outward in the radial direction;
    an inner band section continuous to an inner end of the airfoil section and bent in the circumferential direction;
    a flange section continuous to an axially front end of the inner band section and bent inward in the radial direction;
    a reinforcement fiber fabric continuous throughout the airfoil section, the outer band section, the first hook section, the second hook section, the inner band section and the flange section, the reinforcement fiber fabric being united with a ceramic; and
    a cutout ranging over both an axially leading edge of the airfoil section and the axially leading end of the outer band, the cutout forming a face oblique to the axis, the radial direction, and the circumferential direction.

2. The stator vane of claim 1, wherein a circumferentially furthermost end of the outer band section has a shape complementary to the cutout, whereby the stator vane comes in contact with an outer band section of an adjoining stator vane.

3. The stator vane of claim 1, wherein a face formed by the cutout obliquely crosses both the axially leading edge of the airfoil section and the outer band section, whereby the face relaxes a stress concentration from the axially leading edge of the airfoil section toward the outer band section.

4. A method for producing a stator vane arranged around an axis to form a turbine nozzle, comprising:
    elongating a reinforcement fiber fabric in a radial direction relative to the axis to form an airfoil section;
    bending an outer end of the airfoil section in a circumferential direction relative to the axis to form an outer band section continuous to the airfoil section;
    bending an axially leading end of the outer band section outward in the radial direction to form a first hook section continuous to the outer band section;
    bending an axially trailing end of the outer band section outward in the radial direction to form a second hook section continuous to the outer band section;
    bending the reinforcement fiber fabric at an inner end of the airfoil section in the circumferential direction to form an inner band section continuous to the airfoil section;
    bending an axially front end in the axial direction of the inner band section inward in the radial direction to form a flange section continuous to the inner band section;
    uniting the reinforcement fiber fabric with a ceramic to make the reinforcement fiber fabric be continuous throughout the airfoil section, the outer band section, the first hook section, the second hook section, the inner band section and the flange section; and
    machining the ceramic united with the reinforcement fiber fabric to form a cutout ranging over both an axially leading edge of the airfoil section and the axially leading end of the outer band, the cutout forming a face oblique to the axis, the radial direction, and the circumferential direction.

5. The method of claim 4, further comprising:
    machining the ceramic united with the reinforcement fiber fabric to form the axially trailing end of the outer band section into a shape complementary to the cutout.

6. The method of claim 4, further comprising:
    machining the ceramic united with the reinforcement fiber fabric to make a face formed by the cutout obliquely cross both the axially leading edge of the airfoil section and the outer band section, whereby the face relaxes a stress concentration from the axially leading edge of the airfoil section toward the outer band section.

\* \* \* \* \*